Patented Apr. 15, 1930

1,754,825

UNITED STATES PATENT OFFICE

HERMAN HEUSER, OF CHICAGO, ILLINOIS

FOAM PRODUCTION

No Drawing.   Application filed May 24, 1926.   Serial No. 111,381.

This invention relates to improvements in the production of foam, particularly in beverages, such as soft drinks, cereal beverages and the like. Hitherto it has been customary to employ saponins for this purpose, ordinarily in the form of a more or less concentrated solution or syrup, notwithstanding the objections which are frequently made to the use of saponins from the standpoint of their possible effect upon the health of the user.

I have found that, by the controlled hydrolysis of protein bodies in a special manner that I have devised, I am able to produce such protein conversion products which have undergone a limited hydrolytic conversion and which have a foam producing power equal to and in many cases far exceeding that of saponin. Such products may be obtained in the form of solutions, which may be concentrated to any desired extent or may be reduced to a dry state to produce products which may be employed in the production of foam in beverages.

In carrying out my invention, I may employ any suitable protein compound, such as egg albumen, blood fibrin, hæmoglobin, gluten, or the like. I prefer to employ egg albumen, which is most readily obtainable in a high degree of purity without requiring special preparation of the raw material. I have referred in the specific examples hereinafter to egg albumen as the source of the foamforming material produced in accordance with my invention, but I am not limited thereto since other proteins, as above referred to, may be employed.

In methods of protein conversion as hitherto carried out, acids or alkalis have been employed. In the use of acid media, as hitherto carried out, it has been necessary to employ them in such concentration as not to form the high foam-producing type conversion products. Alkalis have hitherto been employed in low concentration, but the products form highly undesirable sulfur compounds when incorporated in beverages.

I have discovered that a conversion product of very high foam-producing properties may be produced by a controlled alkali hydrolysis of the proteins followed by a treatment with dilute acid, the acid being of a dilution which is not generally effective as a conversion agent in the treatment of proteins. The resulting product is free from the undesirable presence of ordinary alkali conversion products.

In carrying out my invention, I may effect the controlled limited conversion of the protein material in an alkaline, followed by an acid medium or by means of suitable enzymes. The conversion is carefully controlled so that the products resulting will not be of the type of those now generally known in commerce, such as peptones and the like, with low foam producing power very substantially less than that of saponin; in fact, only from one-one hundredth to one-twentieth of the foam producing capacity of the latter substance.

One example of a process suitable for producing the foam producing substance of my invention is as follows:

One hundred kilograms of raw egg white (containing 12 kilograms of proteins are mixed with one thousand liters of distilled water containing seventy-five liters of a normal solution of sodium hydroxide. The resulting mixture contains about 0.27% sodium hydroxide. It is warmed to 40° C. and held at that temperature until the protein dissolves. This is effected in about fifteen minutes. A clear solution is formed, but relatively little conversion of the protein has taken place at this point. The solution is then heated to a temperature above 40° C., and preferably to the boiling point to effect the desired conversion. This is accomplished by boiling the solution for 10 to 20 minutes. The boiling or heating is not continued beyond this point, to avoid further conversion or hydrolysis of the protein bodies, which at this stage are apparently in the form of metaproteins, further degradation products being substantially absent. I prefer to control the length of the period of heating by the foam-producing capacity of the desired product, which may be determined at intervals from samples withdrawn from the solution. The product at this stage has a high foam producing value, but is unsuitable for use in beverages by reason of the formation of undesirable sulfur compounds, sulfides, etc.

In preparing the material for the market, I effect protein conversion thereof, stabilizing it and reducing it to concentrated form. I preferably acidify the solution of protein conversion products, using any suitable acid. For example, I may use hydrochloric acid or other acid of high ionizing power, the hydrochloric acid being preferred because the result of its reaction with the alkali present is common salt. For example, I may add normal hydrochloric acid solution gradually and while stirring in order to dissolve the coagulum produced at the point where the hydrochloric acid is added. After the addition of a proper amount of the hydrochloric acid, say 65 to 68 liters of normal solution, the solution begins to acquire a milky appearance, which becomes the most pronounced at the isoelectric point, which is reached when about 70 to 75 liters of normal hydrochloric acid solution is added. The addition of hydrochloric acid is then continued until the milky appearance just disappears, a total of 90 to 95 liters of normal solution being required. The product is now relatively stable and may be heated without undergoing further conversion and destroying the foam-forming capacity of the material. A very slight amount of excess hydrochloric acid is present, which does not effect hydrolysis even at the boiling point, but has a preservative effect. The foam-forming capacity of the material at this stage, based upon the amount of proteins originally used, is at least equal to that of saponin, and may be from 2.5 to 2.75 times as great.

The solution may now be evaporated to reduce its bulk. If a solution is desired, it is concentrated to about 50 to 60% of its volume, a further reduction being undesirable because of the limited solubility of the protein conversion products. If a dry product is desired, however, the concentration may be continued to the point at which the protein conversion products are thrown out of solution in the form of a precipitate, the precipitate being separated and dried at low temperature.

The proportions of reagents employed may be varied within fairly wide limits. Thus, as low as 45 liters of normal sodium hydroxide solution may be employed to dissolve the amount of proteins used in the above example, and correspondingly lower amounts of hydrochloric acid. Larger proportions of sodium hydroxide and hydrochloric acid than those above specified may also be used, but it is not desirable so to do, because the larger proportion of sodium chloride formed has a tendency to salt out the protein conversion products.

As has been already set forth, the desired hydrolytic conversion may be produced by successive alkaline and acid media or, if desired, by the action of enzymes such as pepsin, bromelin, papain, or the like. To illustrate an optional method of manufacture, the following example is given:

One hundred kilograms of raw white of egg (containing 12 kilograms of protein) and mixed with 1000 liters of water (preferably distilled) and hydrochloric acid is then added, a suitable amount being 0.455 liter of acid of specific gravity 1.20 to each 100 liters of the mixture, which has a total volume of approximately 1100 liters. One kilogram of commercial scale pepsin (1 to 3000), preferably previously dissolved in distilled water, is stirred into the mixture. It is then warmed to about 43° C. and held at this temperature, being occasionally gently stirred.

The desired conversion is effected ordinarily in from 2 to 2½ hours. In order to determine its termination, after about 1¾ hours from the time the pepsin was added, samples are taken at occasional intervals. The sample is neutralized, preferably by titration with normal alkaline solution, a coagulation of acid protein being noted during the addition of alkali slightly before the neutralization point is reached, this coagulum later disappearing on completing the neutralization. When the coagulation produced during the addition of the alkali is small, and on boiling the sample, no coagulation is formed, the desired conversion of the proteins has been secured. At this point, which is ordinarily after 2 to 2½ hours action of the pepsin, the entire solution is heated to its boiling point and boiled for about five minutes to destroy the pepsin and stabilize the product which is apparently substantially in the proteose state. Further conversion must be avoided, as it would result in a substantial loss in the foam producing capacity of the material.

The solution is then cooled to ordinary temperatures and clarified by filtration or sedimentation. Thus manufactured, the product is very stable. It is preferably stored in glass or in wood and protected from the action of light. Based upon the quantity of solid protein originally used, the foam-producing capacity of this material is 1.5 to 2 times that of saponin.

The solution produced by the method just described may be concentrated to a syrup by evaporation to form 1/10 to 1/12 of its original volume, or by further concentration, say to 1/16 to 1/18 of its original volume, it may be reduced to a jelly-like consistency, having a greenish yellow color. If it is desired to market the product in neutral instead of in acid condition, it is preferably concentrated to a desiccated product, in which condition it then has greater stability. It may be employed in imparting foam to soft drinks, cereal beverages or the like, or may be used in the household, or in bakeries or confectioneries to increase the foam produced by beating egg-whites, for the production of marshmallow and other beaten icings and the like.

The hydrocholoric acid employed as described in the above example, imparts to the mixture before the addition of pepsin an acidity of slightly greater than 0.18%. Substantially less may be used, if desired; for example, the conversion may be effected with only about 0.09% hydrochloric acid acidity. More may be used, if desired, but is not necessary. The proportion of pepsin employed may be reduced to approximately one-fourth that stated in connection with the example. Furthermore, the conversion may take place at temperatures higher than that above given; for example, at temperatures of 50 to 55° C. It may also be carried out at lower temperatures, even as low as room temperature; but at reduced temperatures the action of the pepsin becomes retarded so greatly as to be commercially uneconomical. Other acids than hydrochloric acid may be used; for example, tartaric, lactic, acetic, and other organic and inorganic acids may be employed. In general, the use of organic acids retards the rate of conversion.

The above specific examples have been set forth to show a variety of methods by which the desired conversion of proteins into compounds having a high foam-producing activity may be effected. Other methods, as set forth hereinbefore, may be employed and in each case the extent of conversion may be readily controlled by tests, such as those set forth in connection with the examples hereinbefore given or by making foam-producing tests in comparison with standard solutions of saponin at occasional intervals during conversion. In making such tests, it will be noted that the conversion products reach a point at which their foam capacity is at a maximum at least equal to and ordinarily from 1.5 to 2.5 times as great as that of saponin, after which a diminution in foam-producing capacity begins. Care must be taken to stabilize the material before this diminution of foam producing capacity begins or is allowed to proceed to any substantial extent, as it becomes increasingly rapid, the foam-producing capacity being quickly reduced from one one-hundredths to one-twentieth that of saponin in a very short time if excessive conversion is effected.

As indicated by the comparison of the foam-producing capacity of these conversion products with that of saponin, very small proportions are required, for example, in soft drinks and beverages for producing a desired foam. Thus, with even the dilute solutions resulting from the specific examples above set forth, one part of such dilute solutions are adequate to produce foam in 250 parts of a beverage drink. Equivalent proportions of the concentrated or dried products may be used, the proportion indicated being the equlivalent approximately of one part of the original protein used to twenty-one thousand parts of beverage.

I claim:

1. The method of producing a foam-producing substance comprising subjecting a protein in aqueous solution successively to alkali and acid hydrolytic conversion and terminating the conversion process when the conversion products have a high foam-producing capacity.

2. The method of producing a foam-producing substance which comprises heating an alkaline solution of protein, terminating the heating at a point at which the solution has a foam producing capacity, based on the weight of protein converted, at least equal to that of saponin, neutralizing the resulting solution and further acidulating it to dissolve the coagulum of precipitated conversion products.

3. The method of producing a foam-producing substance which comprises boiling an alkaline solution of egg albumen for ten to twenty minutes, thereby hydrolyzing the protein and forming a product having a foam-producing capacity based on the solid protein converted at least equal to that of saponin, adding hydrochloric acid thereto to bring the solution to the isoelectric point, and further acidulating the solution to dissolve the coagulum formed.

4. The method of producing a foam producing substance comprising subjecting a protein to hydrolytic conversion to meta proteins in alkaline solution and slightly acidifying the solution.

5. The method of producing a foam producing substance, which consists in dissolving proteins in aqueous solution containing about 0.27% of sodium hydroxide, heating the solution to about the boiling point for between 10 to 20 minutes thereby converting the protein into meta protein, adding hydrochloric acid to the solution to an excess of 0.07% and concentrating the solution.

HERMAN HEUSER.